United States Patent [19]

Keen et al.

[11] 4,019,461
[45] Apr. 26, 1977

[54] SYSTEM FOR CONTROLLING FEED OF LIVESTOCK

[75] Inventors: Everett Morgan Keen; Anthony John Siciliano, both of Vineland; Kiran Chhabildas Shah, Millville; Serge Artamonoff, Vineland; Leonard Roy Stigen, Williamstown, all of N.J.

[73] Assignee: Diamond International Corporation, New York, N.Y.

[22] Filed: Nov. 7, 1975

[21] Appl. No.: 630,015

[52] U.S. Cl. .................................. 119/18; 119/52 B
[51] Int. Cl.² ........................................ A01K 5/02
[58] Field of Search ........... 119/18, 22, 51.11, 52 B

[56] References Cited
UNITED STATES PATENTS

| | | | |
|---|---|---|---|
| 3,312,194 | 4/1967 | Ernst | 119/22 |
| 3,664,302 | 5/1972 | Wienert | 119/18 |
| 3,722,475 | 3/1973 | Wittern et al. | 119/18 |

*Primary Examiner*—Hugh R. Chamblee
*Attorney, Agent, or Firm*—Karl W. Flocks

[57] ABSTRACT

A system for economically controlling feed of livestock to effect maximum consumption of all feed ingredients supplied to livestock comprising cage structure for confining livestock in a plurality of separate groups, separate feed troughs on the cage structure for each of the groups of livestock, and individual travelling feed dispensing hoppers for dispensing feed into the separate feed troughs. The system also includes a control mechanism for periodically effecting travel and return of the feed hoppers to dispense feed into the troughs numerous times in the course of each day. Each of the feed dispensing hoppers includes feed dispensing mechanism for causing feed to be dispensed therefrom into the troughs associated therewith. The feed dispensing mechanisms in the hopper for one group of livestock is of such capacity as to dispense all the feed that the group of livestock can eat during the course of each day with such feed being dispensed in small quantities numerous times each day. The feed dispensing mechanism in the hoppers for all other groups of livestock are of substantially identical dispensing capacity, but of about 5-10% less than the capacity of that for the one group of livestock to be fed all that it can eat.

23 Claims, 9 Drawing Figures

SYSTEM FOR CONTROLLING FEED OF LIVESTOCK

BACKGROUND OF THE INVENTION

1. Field of the Invention

The present invention relates to systems for feeding and raising livestock and in particular for feeding and raising poultry or the like confined in cage batteries.

2. Description of the Prior Art

U.S. Pat. Nos. 2,536,621 [Arnold] and No. 3,158,137 [Summerour] are generally representative of the type of prior art to which the system of the present invention appertains. Both the Arnold and the Summerour patents disclose poultry feeding systems in which feed is dispensed from mobile hoppers supported above cage batteries for movement therealong, into feed troughs supported along one or more walls of the cage batteries. The feed dispensing hoppers of the Arnold patent comprising dispensing ports formed in the bottom of the hoppers with spring biased slide valves. It appears that the rate and accuracy at which feed may be dispensed by the Arnold system would be or could be difficult to control and maintain because of the structural details discussed above.

In the Summerour patent, the feed hoppers include metering devices which apparently would be more accurate and easier to control than the Arnold system insofar as accuracy and rate of dispensing is concerned. The Summerour feeding system, however, lacks numerous advantageous features of the present invention, which may be apparent from the following description and claims.

SUMMARY OF THE INVENTION

In the livestock producing industry it is common knowledge that feed is rarely uniform as to grade or ingredients. Numerous reasons account for the lack of uniformity in feed, among which is the fact that livestock, like humans, should have a properly balanced diet. As the feed is made up of various ingredients, it frequently happens that the livestock prefer the taste of certain ingredients over others and will pick out the more tasty ingredients and possibly suffer deficiencies by not eating some of the less tasty ingredients. Also, as the feed ingredients differ, the weight per volume of various feed will differ and a picky animal may consume more or less in weight of feed, particularly if it is more aggressive or faster in its eating habits than that of its mates.

Even in the case of poultry different types have different requirements. Examples of different types of poultry include broilers, breeders, and layers. In the case of broilers, that is poultry raised primarily for consumption of its meat and sold by weight, the conversion of feed to meat would effect significant monetary return for cost of feed. By contrast breeders, that is poultry kept primarily for breeding purposes and not for immediate sale for consumption, do not produce any monetary return for their increase in weight due to being amply fed. In the case of layers, it is known, for example, that eggs laid are as great or better when the feeding of the layers is restricted than when full feeding, that is, all that the layers can eat, is permitted. By way of example, it is noted that large eggs according to commercial grading must weigh 24 ounces per dozen or better and that as the layers age to beyond their peak production the eggs that are then laid are larger and weight as much as 25 or 25½ ounces per dozen. The poultry farmer is paid the same amount for such larger eggs produced by older layers as he is paid for the slightly smaller eggs of younger layers and thus does not profit from the added weight of the larger eggs.

As feed does affect egg size and weight, the poultry farmer would profit from savings in feed cost by reducing the feed the older layers are permitted to consume at least to the point that the eggs produced by such are closer to 24 ounces per dozen that 25 ounces per dozen.

Because of the desirability of restricting the amount of feed poultry are to consume, various methods have been tried. One method of restricting the feeding of poultry is by covering the feed so that the poultry can eat only at given periods during each day and not at other periods of the day. This method has not worked out with complete satisfaction as some birds eat faster and/or are more aggressive so that as long as the feed is uncovered some birds confined in the same general area, whether it be a pen or a cage, will consume more feed than others.

With the above in mind, the present invention relates to a new and improved system comprising a battery cage arrangement in which livestock, such as poultry are confined, fed and raised, and in particular includes a combination of elements and mechanisms with which poultry may be fed and raised in a manner whereby feed economy is attained, whereby the poultry is induced to eat all feed ingredients supplied to it without waste, thereby maintaining and raising poultry in optimum health conditions, thereby controlling size and grade of eggs of layers; and quality of meat of fryers, and other characteristics of the poultry.

OBJECTS OF THE INVENTION

An object of the present invention is to provide a new and improved system of feed and raising poultry in such a manner that the poultry is fed substantially all the feed that it can eat without waste, so that it can attain optimum growth.

Another object of this invention is to provide a new and improved poultry feed system for inducing the poultry to eat all the ingredients supplied to it including ingredients which poultry would normally find distasteful as some nutrient additive or feed supplement is apt to be.

Still another object of the present invention is to provide a new and improved feed system that is fully automatic in operation in carrying forth other objects set forth herein.

Yet another object of the present invention is to provide a new and improved system whereby poultry is confined in separate groups including a pilot group that is automatically fed all that it can eat in the course of each day in numerous periods of feeding with very little feed being furnished to the group during each feeding period.

Still another object of the present invention is to provide a new and improved system whereby all groups of poultry other than the pilot group is supplied a predetermined amount of feed less than that which is supplied to the pilot group during each feeding period.

An additional object of the present invention is to provide a system whereby each group of poultry will be fed at the same time and for the same number of feed periods.

It is also an object of the present invention to provide an automatic feed system in which the over-all amount of feed supplied to all poultry fed and raised thereby is reduced.

Other objects and advantages of the present invention will become apparent from a reading of the following description thereof taken in conjunction with the accompanying drawings.

DESCRIPTION OF THE INVENTION

Figure 3:
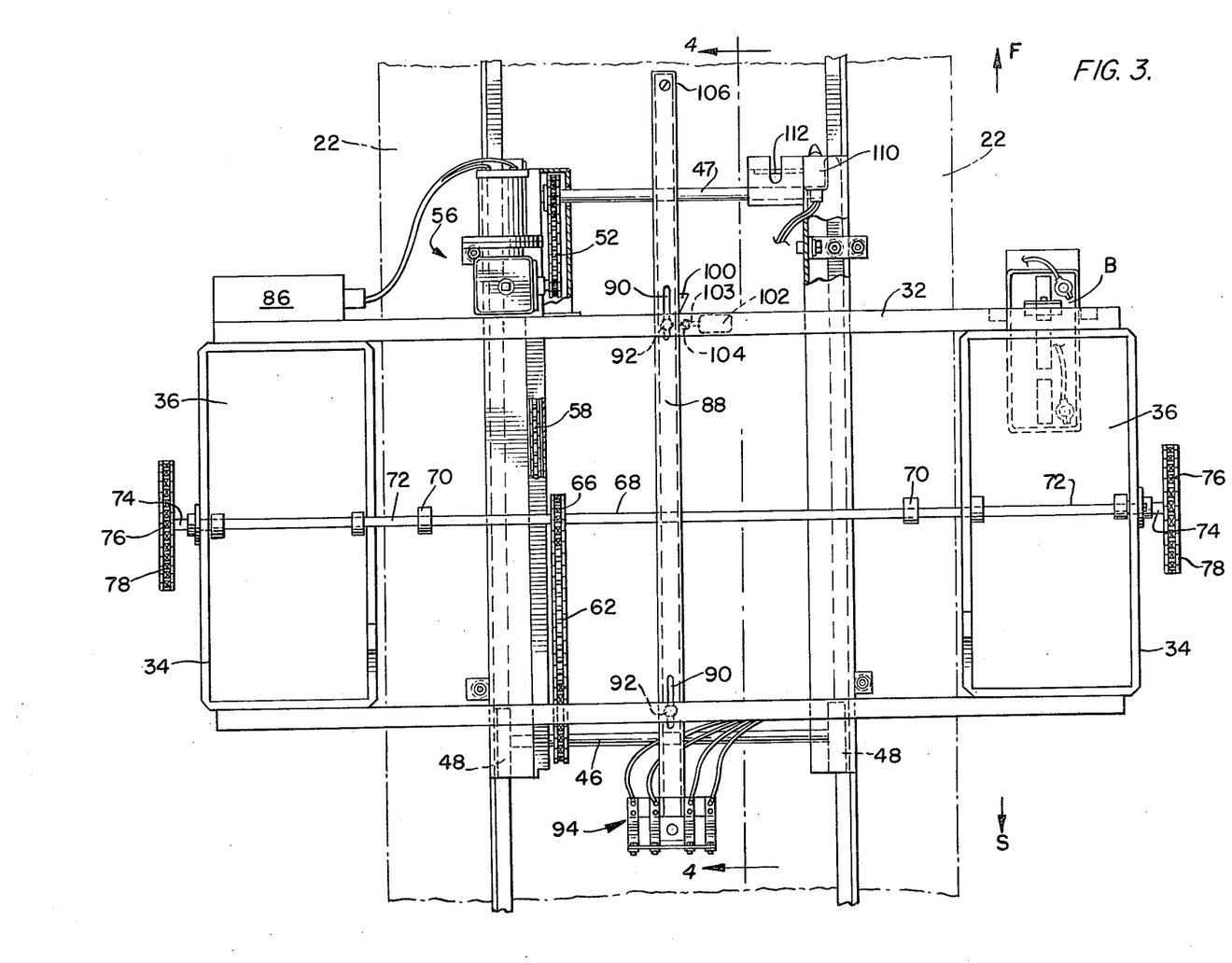
FIG. 3 is a plan view of the feed dispensing unit of FIG. 2.
Figure 4:
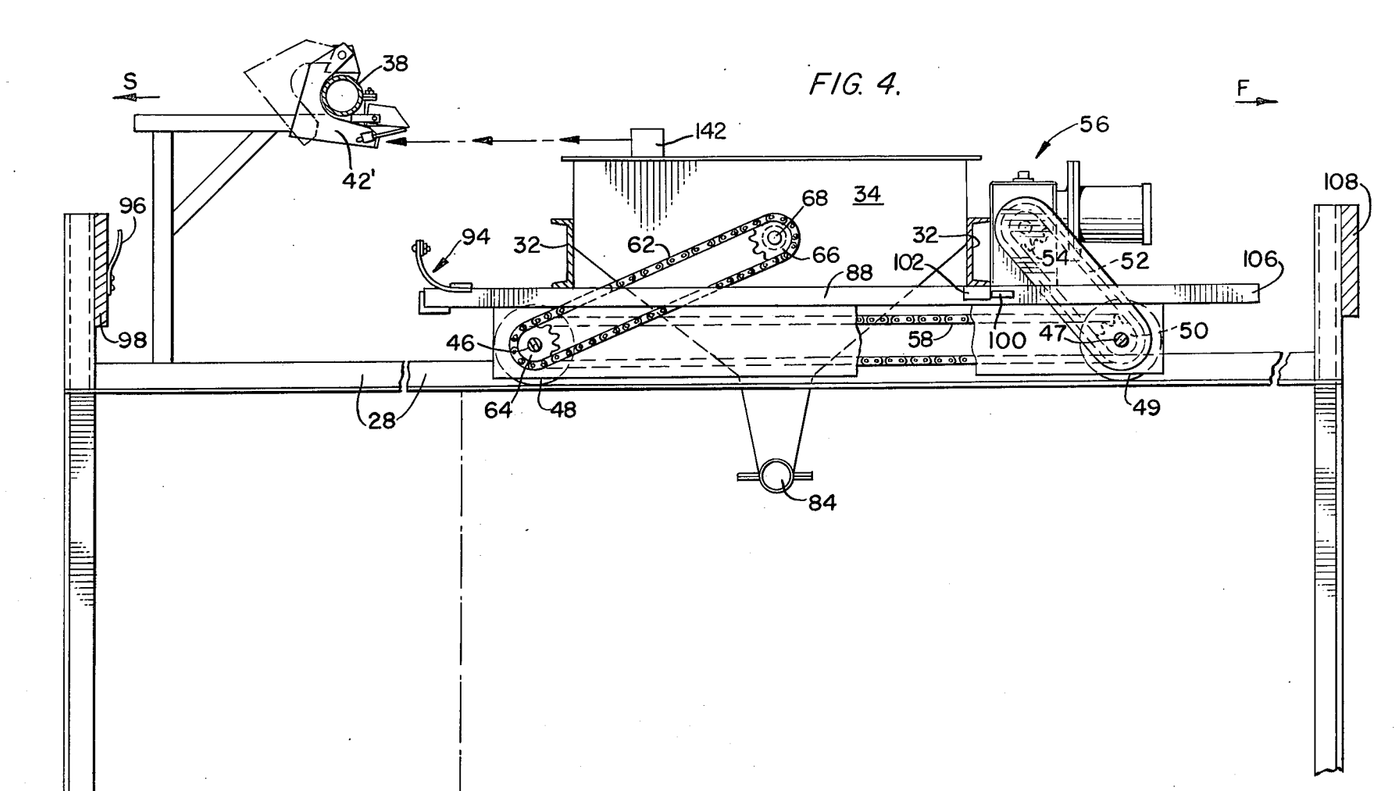
FIG. 4 is an elevational view taken along section 4—4 of FIG. 3.

Referring now in detail to the drawings and in particular to FIGS. 1-4, the reader will readily appreciate that the feed system 10 according to the present invention comprises a plurality of battery cage rows 12, 14, 16, 18, 20 extending from a starting or back end of a poultry house H designated S in FIG. 4 to the other end thereof in the front or forward direction F. Each battery cage row is substantially identical so that they all may be considered described with reference to battery cage row 12, for example, which may for convenience include cages 22 supported on longitudinally spaced A-frame 24 at several vertical levels and facing two aisles. Each cage 22 is formed with or has secured thereto one or more feed troughs 26 into which feed is dispensed and from which poultry occupying the cage 22 may feed itself. The feed troughs 26 preferably are V-shaped in cross-section. A pair of rails 28 extend longitudinally above the two upper cages 22 of cage row 12 which a mobile or travelling feed unit 30 is supported and in operation is driven back and forth from starting end S and forward end F.

Each mobile feed unit 30 comprises a transversely extending carriage 32 on which is supported top loading feed hoppers 34 having top openings 36 through which feed is cyclically loaded by a system supply auger 36 extending above and across the feed system 10 at the starting end S of poultry house H. The feed hoppers 34 of each unit 30 differ only in dispensing feed toward the left or right as would be obvious from the location of tubes T in FIG. 1.

Figure 1:
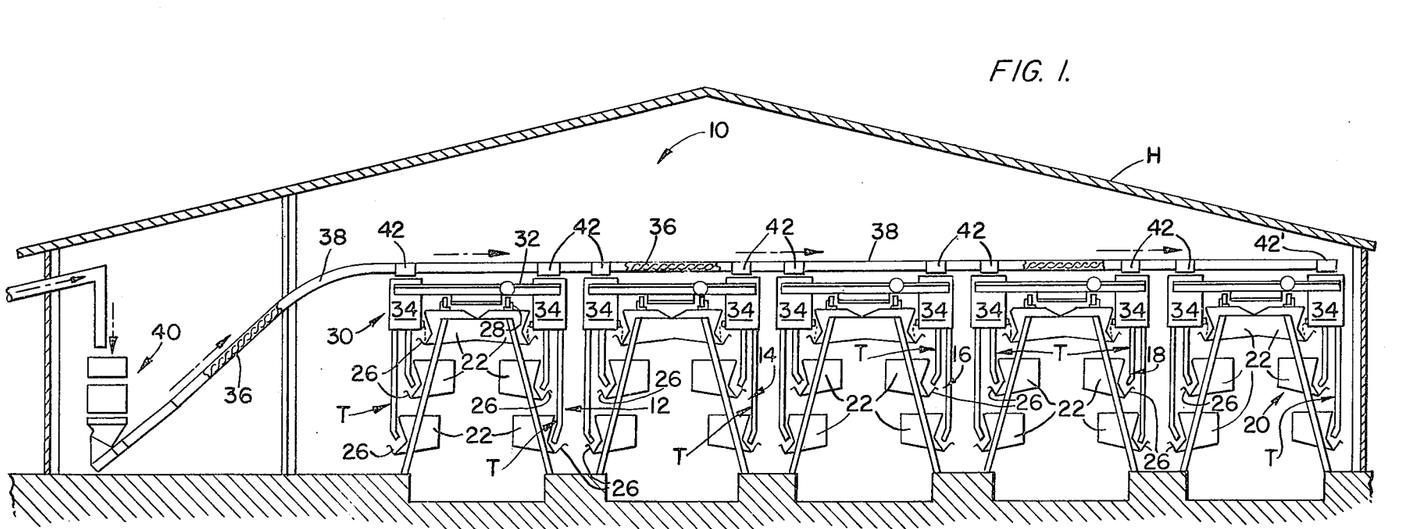
FIG. 1 is an end elevational view of the system from the front end thereof and looking toward the back or starting end thereof.
Figure 2:
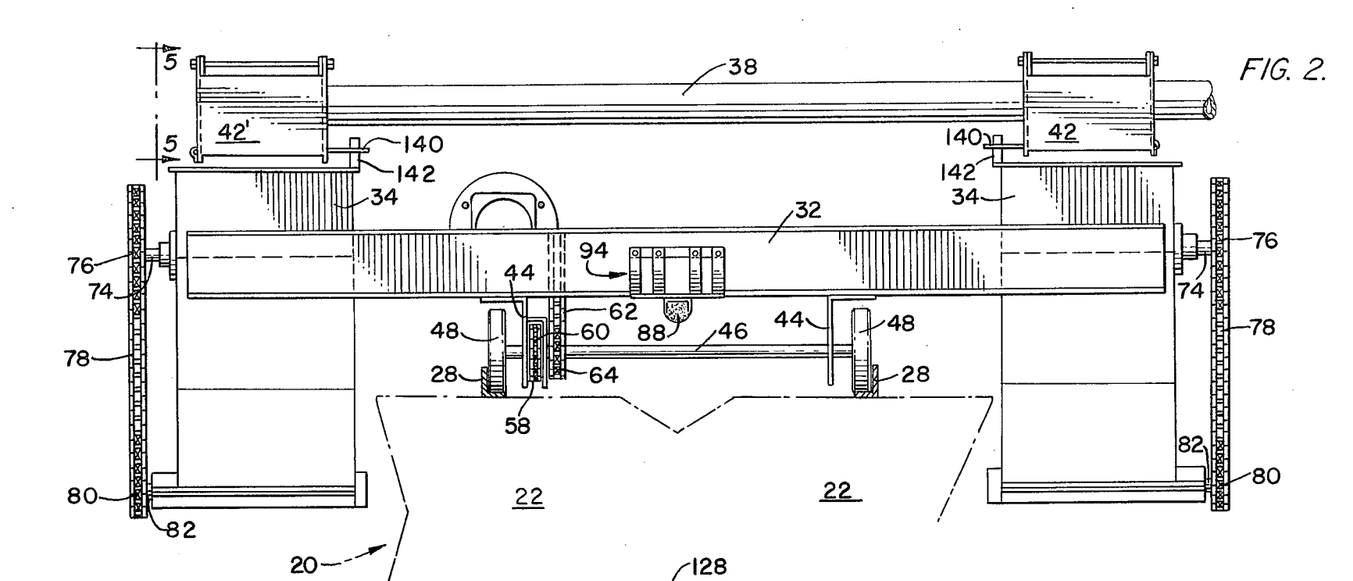
FIG. 2 is an end elevational view of the extreme right feed dispensing unit of the system of FIG. 1 looking from the back end thereof toward the front end.

Auger 36 is disposed in a conveyor tube 38 from a feed weighing or measuring station 40. A plurality of longitudinally spaced openings 39 is provided along the underside of conveyor tube 38 above the path of each of the hoppers 34. A gate assembly 42 is supported on tube 38 and has a hinged gate normally closed by gravity under each of the openings 39 of tube 38. The gate assembly 42' above the right half of cage row 20 differs from the other gate assemblies 40 in that is includes switching mechanism described below.

Extending down from carriage 32 is a pair of brackets 44 which support a pair of axles 46, 47 with wheels 48, 49 on opposite ends thereof and riding on rails 28. Drivingly secured to axle 47 is a driven sprocket 50 with a chain 52 extending therearound. Chain 52 is in turn driven by sprocket 54 of motor-and-gear-reduction unit 56 which is battery operated. A second chain 58 transmits power from a sprocket secured to axle 47 hidden behind sprocket 50 in FIG. 4 to axle 46 via sprocket 60 shown in FIG. 2. A third chain 62 in turn transmits power from sprocket 64 on axle 46 to sprocket 66 secured on intermediate drive shaft element 68 which extends outwardly toward each hopper 34 of unit 30 and is connected by one-way clutches 70 to shaft segments 72 which extent into and through each hopper 34. One-way clutches 79 provide driving connection between drive shaft element 68 and shaft segments 72 preferably when feed units 30 driven in the direction toward forward end F and permit an idle relationship between shaft segments 72 and shaft element 68 when feed units are returning toward starting end S.

On the outer end 74 of each shaft segment 72 is secured an input sprocket 76 with drive chain 78 engaged therearound and which drives a pinion sprocket 80 fixed to a stub extension 82 of a feed dispensing auger 84 rotatably disposed in the lower end of each hopper 34 for dispensing feed through tubes T into troughs 26. Construction of auger 84, which is schematically indicated in FIG. 4, may include such features as are disclosed in copending appliations Ser. No. 626,178, filed Oct. 28, 1975 and Ser. No. 629,661 filed Nov. 6, 1975 and commonly assigned to the assignee of the present application.

Consistent with structure described above, the presence of one-way clutches 70 in the drive train will effect feed dispensing from hoppers 34 into troughs 26 as they are driven toward forward end F and no dispensing as they are returned toward starting end S.

A significant feature of the present invention resides in the fact that the means for dispensing feed into the troughs 26 of the various groups or battery cage rows 12, 14, 16, 18, and 20 are arranged to dispense feed into the various troughs so that the total amount of feed dispensed into the troughs for one group or battery cage row in a day, for example cage row 12, is all that or as much as the cage occupants can eat in a day and the total amount of feed dispensed into the troughs for all other groups or battery cage rows 14, 16, 18, and 20 in a day is significantly less than the amount dispensed into the troughs of cage row 12. For example, the amount of feed to be dispensed into the troughs 26 of cage rows 14, 16, 18 and 20 may by the system 10 of the present invention be from 5–10% less than the amount to be dispensed into the troughs 26 of cage row 12. In carrying forth the concept of the present invention, pinion sprockets 80 of either or both hoppers 34 of mobile feed unit 30 for cage row 12 is smaller and therefore faster than that for cage rows 14, 16, 18 and 20. With the speed of pinion 80 and therefore the speed of auger 84 of cage rows 12 driven faster than augers of cage rows 14, 16, 18 and 20, it will be clear that a proportionately lesser amount of feed will be dispensed into the troughs 26 of the cage rows 14, 16, 18 and 20. While gear or speed ratio of the driven augers 84 is used to control the amount of feed to be dispensed into the various troughs 26, it is within the contemplation of this invention that instead of or in addition to different gear ratios variable size feed dispensing ports may be used to control the amount of feed to be dispensed into the troughs 26 of the various cage rows 12, 14, 16, 18 and 20.

A further feature of the feed system 10 according to the present invention resides in the fact that mobile feed units 30 for each of the battery cage rows 12, 14, 16, 18 and 20 are operable to dispense feed in very small quantities over numerous feed periods over the course of each day, such for example as at the rate of about one ounce per fifteen inches along the length of the trough 26 during each feeding period. Each mobile feed unit 30 as disclosed is self-propelled by a self-contained electric motor unit 56 powered by a storage battery B connected via a relay control box 86 which may include manually operated disconnect switches.

As seen in FIG. 3, a slide bar 88 is provided with slots 90 through which pins 92 extend to secure bar 88 in sliding relationship with carriage 32. Bar 88 includes an electrical contact end 94 with a plurality of individual terminals for establishing contact with terminals 96 of a board 98 at starting end S. Contact between the terminals of bar 88 with terminals 96 of board 98 will close a circuit for charging battery B and also for simultaneous starting of all mobile units 30 toward forward end S in a feed dispensing run upon actuation of suitable relays when all "go" conditions in a control circuit to be described below are fully satisfied. Control bar 88 is provided with a cam 100 extending along one side thereof which is adapted to move longitudinally with bar 88. Secured to carriage 32 is a reversing switch 102 having a reversing stem 103 with a cam follower roller 104 projecting into the path of cam 100. As shown in FIG. 3, carriage 32 is travelling in a feed dispensing direction toward forward end F with bar 88 having been pushed forward by coming into contact with terminals 96 of terminal board 98 so that cam 100 is free of roller 104. Upon reaching forward end F the forward end 106 of bar 88 will strike an abutment 108 extending in its path whereupon as carriage 32 continues for a short distance toward forward end F roller 104 will ride up cam 100 to deflect stem 103 and reverse the polarity of motor unit 56 as pins 92 move forwardly in slots 90. With the polarity of motor unit thus reversed carriage 32 will be driven in the reverse direction toward starting end S until carriage 32 arrives at starting end S and pins 92 slide toward starting end S in slots 90 when contact end 94 of bar 88 strikes terminals 96 so that roller 104 is off of cam 100 and stem 103 is free and undeflected so that the polarity of motor unit 56 resumes the polarity for forward drive. As an adjunct to the circuitry of drive motor unit 56 power cut-off switch 110 with a resiliently secured actuating stem 112 extending therefrom which will cut off motor unit 56 upon being deflected by an abutment placed in its path, which abutment may be located at forward end F and relocated toward or away from starting end S, if, for example, use of fewer cages in any row is desired.

Figure 5:
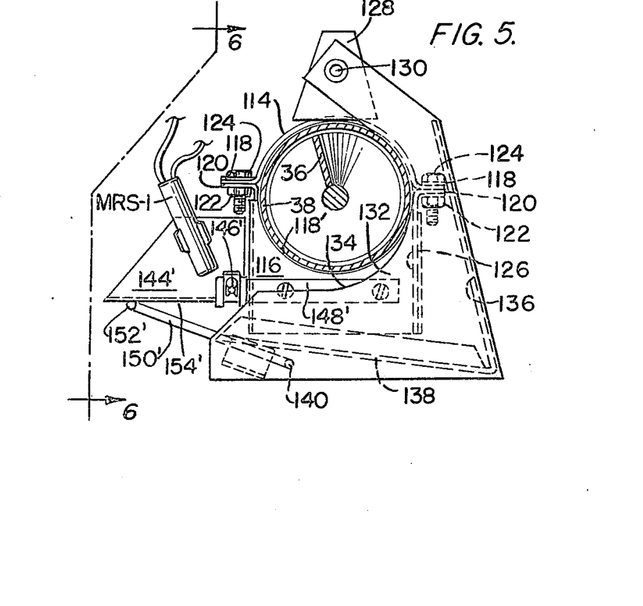
FIG. 5 is an elevational view taken along section 5—5 of FIG. 2.
Figure 6:
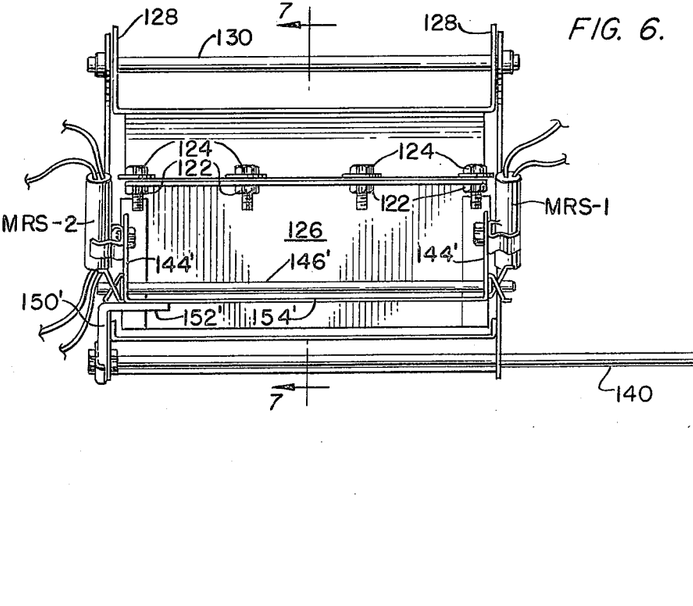
FIG. 6 is an elevation view taken along section 6—6 of FIG. 5.
Figure 7:
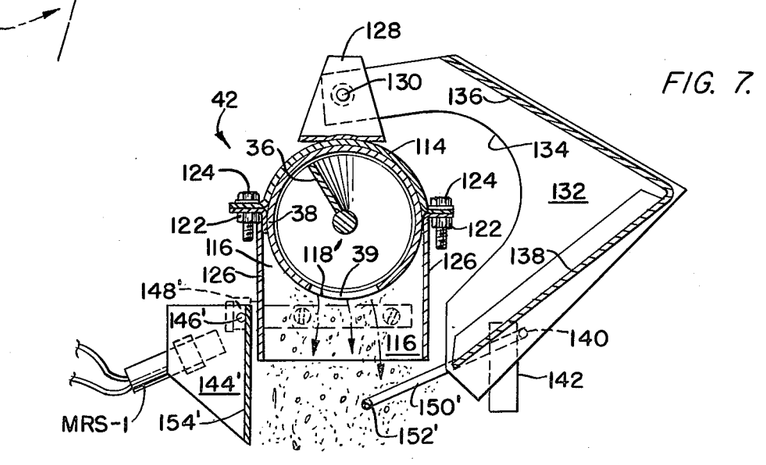
FIG. 7 is an elevational view taken along section 7—7 of FIG. 6 with the gate member open to permit loading feed into a hopper.

As mentioned above, a hinged gate assembly 42 is provided for each opening 39 of conveyor tube 38 as illustrated in FIG. 1 with the exception that a hinged gate assembly 42' illustrated at the extreme right position includes switching mechanism not provided in the gate assemblies 42 to the left of gate assembly 42'. With the foregoing in mind and reference to FIGS. 4–8, it will be noted that each gate assembly 42 and gate assembly 42' comprises a semi-cylindrical sleeve portion 114 extending around the upper surface of tube 38, spaced apart generally vertical side walls 116 with semicircular cut-out edges 118 extending around the under surface of tube 38. To secure sleeve portion 114 and side walls 116 together clamping flanges 118', 120, respectively, on opposite sides thereof which are secured together by nut and bolts 122, 124, respectively. A second pair of generally vertical walls 126 are interconnected with side walls 116 to define an open bottom skirt around the opening 39 in tube 38. Sleeve portion 114 is formed with upturned ears 128 through which extends a generally horizontal pivot post 130. Hingedly supported by post 130 laterally outwardly of ears 128 is a pair of spaced apart generally vertically extending side walls 132 with each having a cut-out portion 134 to allow for passage of tube 38 in the closed condition of gate assemblies 42 and 42' as seen in FIG. 5. Spaced apart walls 132 are interconnected by a back wall 136 and a bottom wall 138. Bottom wall 138 is adapted to extend under opening 39 when hinged side walls hang freely under the force of gravity to close opening 39 or to be urged away from opening 39 to allow feed to discharge from opening 39 to load hopper 34. A horizontally extending contact rod 140 is secured to side walls 132 and projecting to one side of the side walls 132. To open opening 39 to allow feed to discharge from tube 38 and into a hopper 34 standing thereunder a striker member 142 is provided at an upper edge of hopper 34 intermediate the front and back ends of the hopper so that when the hopper is moved back into a position at the starting end S of the system opening 39 will be open thereabove and as hopper 34 is moved forward therefrom bottom wall 138 will close under opening 39 depending upon contact and absence of contact between striker member 142 and contact rod 140.

Each gate assembly 42 and gate assembly 42' includes all structure described in detail above. Gate assembly 42', however, includes additional structural elements identified herein with primed reference numbers which gate assemblies 42 do not include. The gate assembly 42' in the extreme right position in FIG. 1 may now be seen in detail in FIGS. 5–7 as including a pair of side plates 144' hingedly supported on a rod 146' secured to side walls 116 by brackets 148' extending forwardly therefrom. Extending generally at 90° to contact rod 140 forwardly therefrom is an intermediate portion 150' from which extends at the forward end thereof at 90° support portion 152'. Stabilizing connector plate 154' extends between the side plates 144' and connects same together. Support portion 152' is adapted to support connector plate 154' and side plates 144' in a raised position as may be seen in FIG. 5 when bottom wall 138 is closed under opening 39 of tube 38. When bottom wall 138 is pushed out from under opening 39 by reason of striker member 142 moving against contact rod 140 and support portion 152' is withdrawn from beneath connector plate 154' side plates 144' under the force of gravity swing about rod 146' from the position in FIG. 7.

An outwardly directed spring clip 156' is secured on the outer face of each side plate 144' with a first mercury switch MRS-1 held in one clip 156' and a second mercury switch MRS-2 held in the other clip 156'.

Switch MRS-1 is provided with leads on one end thereof while switch MRS-2 is provided with leads on both ends thereof, which function as a single-throw double-pole switch. Switches MRS-1 and MRS-2 extend generally parallel to each other. It is clear that when bottom wall 138 is closed under opening 39, as seen in FIG. 5, and side plates 144' are supported in the raised position the leads in the upper end of switch MRS-1 are disconnected so that the circuit thereof is open. In this regard the circuit of switch MRS-1 supplies current to a motor for driving hopper loading cross auger 36 and also to a motor for a bulk bin motor which delivers feed to weighing station 40. Thus with switch MRS-1 in the position of FIG. 5 auger 36 cannot be driven. When bottom wall 138 is out from under opening 39 plates 144' drop to the position where the leads of switch MRS-1 are closed in its circuit allowing the motors for cross auger 36 and for supplying feed to weighing station 40 and a bulk bin to be driven at the same time leads at the corresponding end of MRS-2 are connected to close a circuit which will sound an alarm to advise an attendant in due course that is after a lapse of time of predetermined length that feed has not been delivered to all hoppers 34 by auger 36 and to take corrective action, either to turn off motors if necessary and/or see to it that feed is delivered to all hoppers 34.

Where feed has been supplied to all hoppers 34 each in turn from left to right in FIG. 1, feed in each hopper starting from the first hopper 34 on the left in FIG. 4 is filled until feed builds up in a mound to close up opening 39 before feed can be and is delivered to the next hopper 34 and so on down the line. If there is enough feed supplied in the system 10 to fill the last hopper 34 on the right in FIG. 1, the feed will build up a mound to push against connector plate 154', to urge it to hinge in the clockwise direction about rod 146' whereby the leads of switch MRS-1 will be opened and the leads in the corresponding end of switch MRS-2 for sounding an alarm will be open, but the leads at the other end of switch MRS-2 will be closed in a circuit which upon passage of time will be activated by a clock mechanism to operate starting mechanisms for starting up motor units 56 of all mobile feed units 30.

Figure 8:
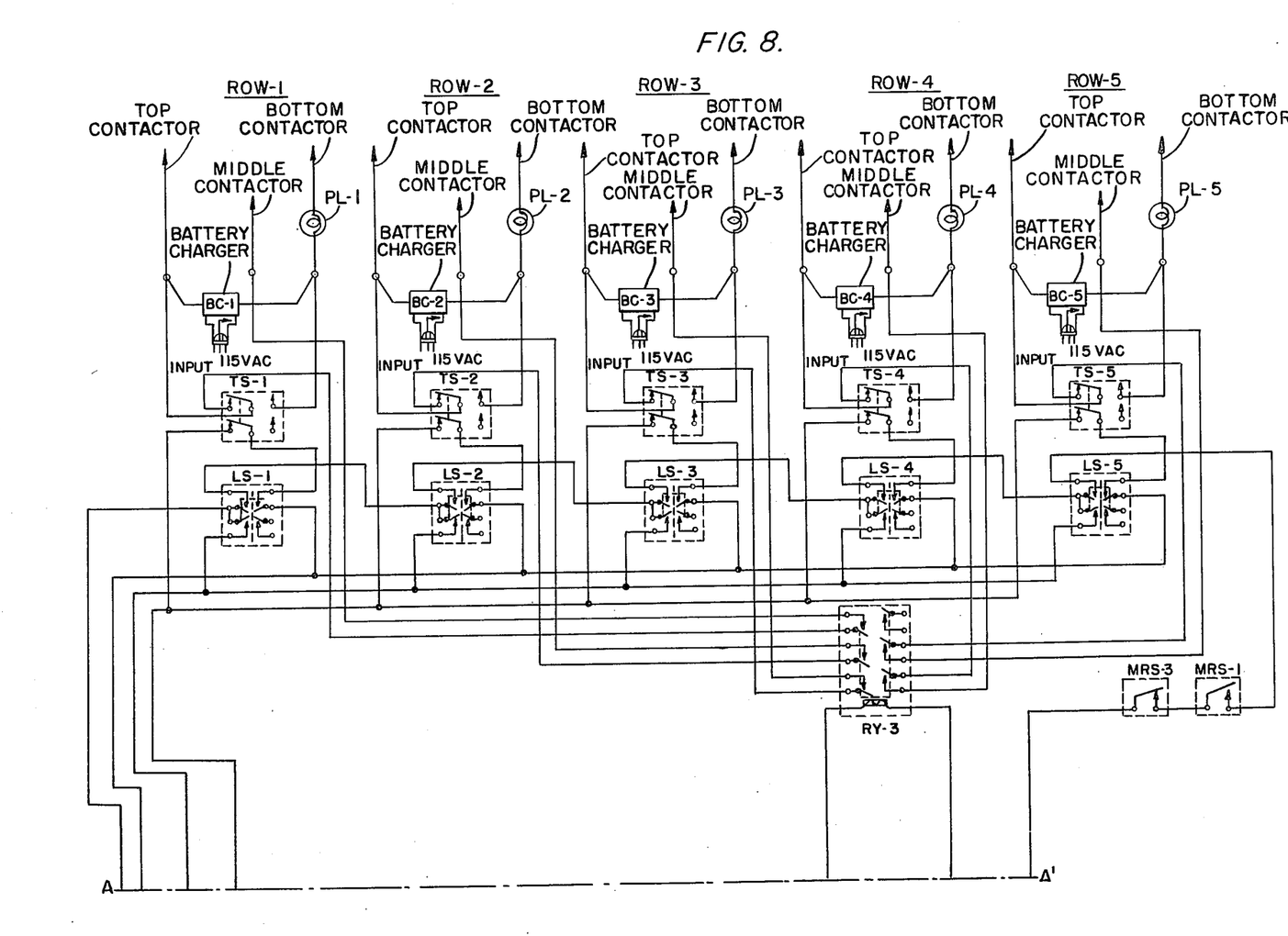
FIGS. 8 and 9, show two halves of a control circuit for the system of the invention in which the planes A—A' at the bottom of FIG. 8 and at the top of FIG. 9 should be connected to complete the circuit.
Figure 9:
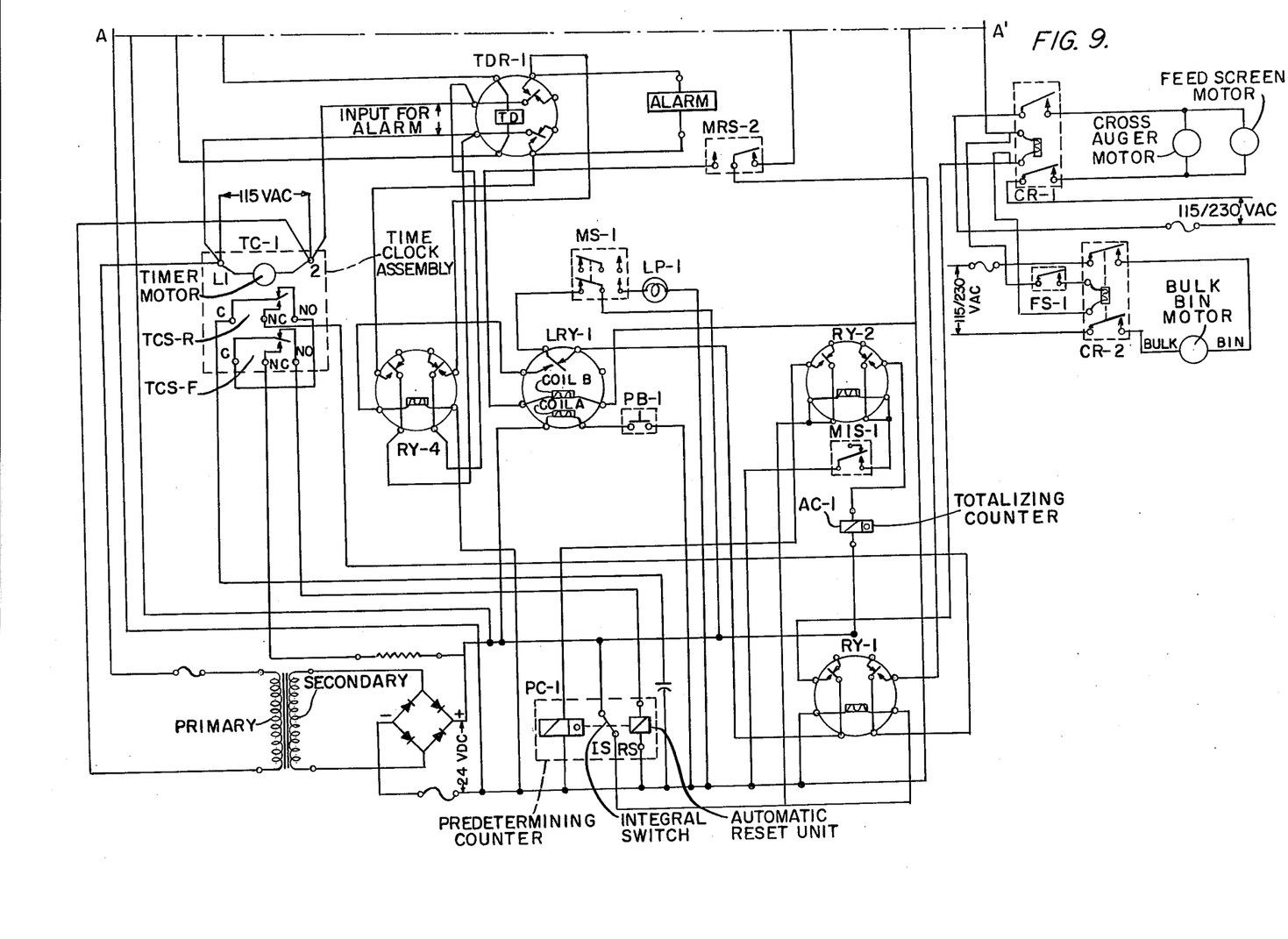

Such control circuitry as are necessary to sound off an alarm, if necessary, to turn on various motors for driving a bulk bin conveyor, hopper loading conveyor, mobile feed units, simultaneous operation of all units at various times of the day, and other accessories are clearly illustrated in FIGS. 8 and 9 and are further described below:

For an embodiment of electrical circuitry which may be used to control the apparatus of the present invention, reference is made to FIGS. 8 and 9. This circuit diagram is for controlling the operation of a cage system 10 having five mobile feeding units 30 which move along a path over five cage rows 12, 14, 16, 18, and 20, designated in FIG. 8 as Rows 1-5, respectively. In a similar manner additional mobile units to travel along additional rows may be added as needed, each unit connected as shown for the units in FIGS. 8 and 9.

The circuit shows the instant when all units 30 in Row-1 thru Row-5 are away from the front end of each cage row; either travelling down the row dsitributing feed to the birds ro returning to the distributing end after the feed distribution.

When all the units in Row-1 thru Row-5 return to the starting end S, they make contact with contactors T-1 through T-5, M-1 through M-5, and B-1 through B-5, respectively, mounted on the back end of each cage row. The contacts on limit switch LS-1 through LS-5 are reversed. Mercury switch MRS-2 reverses its contacts.

Predetermining counter PC-1 is set for a predetermined number equivalent to the number of dumps of feed to be delivered to birds every day and is provided with automatic reset unit RS which resets the numbers at a pre-set time on time clock assembly TC-1.

As long as the predetermining counter PC-1 does not zero out or as long as feed remains to be delivered for the day, relay RY-1 stays energized. When all the units return to the front end closing the contacts on mercury switch MRS-1, the contactors CR-1 and CR-2 are energized and the contacts are closed. This starts bulk bin, feed screen, and cross auger motors. Bulk bin and feed screen motors convey feed from the bulk bin to the cross auger boot, whereas, the cross auger motor conveys the feed from the boot to each unit at a time in a numerical order.

If to much feed accumulates in the cross auger boot, fill switch FS-1 opens the contacts, thereby, de-energizing and opening contacts of contactor CR-2. This shuts off the bulk bin motor. When feed level in cross auger boot falls below a certain level, fill switch FS-1 closes the contacts, thereby, energizing and closing contacts of contractor CR-2. This starts bulk bin motor, conveying feed from the bulk bin to cross auger boot.

Before the feed is conveyed to the cross auger boot, feed is screened to remove all foreign materials and weighed in a feed scale. The contacts on limit switch MIS-1 are closed for each dump of feed conveyed from bulk bin to the individual units through cross auger boot. This energizes relay RY-2 closing its contacts, thereby subtracting one count on predetermining counter PC-1 and adding one count on totalizing counter AC-1. This allows totalizing counter AC-1 to register the total number of feed dumps conveyed and then distributed to the birds in a day. Predetermining counter PC-1 shows the number of dumps of feed remaining to be distributed to the birds from a preset number of dumps for the day.

When the last unit in the last row or Row-5 in the present illustration is filled with feed to its proper level, mercury switch MRS-1 opens its contacts and de-denergizes the contactors CR-1 and CR-2 which in turn shut off the bulk bin, feed screen, and cross auger motors. Also when the unit in Row-5 is filled to its proper level, mercury switch MRS-2 reverses its contacts.

When time clock assembly TC-1 closes contacts on switch TCS-R, the relay RY-3 is energized closing all the contacts. This gives a momentary 'start' signal to each unit in a cage row by way of leads designated as top contactor and middle contactor for each row in FIG. 8 which are connected to two terminals 96 on board 98 and through two cooperating terminals on contact end 94 leading to a motor unit 56. As a result, each unit travels down the length of the complete cage row distributing feed. Each unit reverses itself at the end of the row and comes back to the front end making contact with all the contactors T-1 through T-5, M-1 through M-5, and B-1 through B-5, respectively.

The complete process is repeated again till the preset number of dumps are distributed to the birds. Time clock assembly TC-1 is set so that the units make 15 to 20 trips in a day depending on the amount of feed to be distributed to the birds.

When the units return to the starting end S and are being filled with feed for the next trip, the battery on each unit is charged through the battery chargers BC-1 through BC-5, respectively, mounted near the starting end S of each cage row. In this regard, the battery B of each mobile unit is charged by way of two leads designated top contactor and bottom contactor in FIG. 8 which are connected to two terminals 96 on board 98 and through cooperating terminals on contact end 94 leading to a battery B. It is noted that contact end 94 is shown to include four terminals in FIG. 3; it is clear that one of these four terminals may be a neutral terminal and another one of such terminals provides dual functions of charging and starting in the manner that the three contactors designated as top contactor, bottom contactor and middle contactor in FIG. 8 with the top contactor being common to the charging and starting circuits.

When a predetermined quantity of feed is conveyed from the bulk bin and distributed to the birds by the units for the day, the predetermining counter PC-1 shows all zeros.

At '0000' an integral snap action SPDT switch IS opens the contacts and de-energizes relay RY-1, thereby, opening the contacts. This turns off the complete system till the predetermining counter PC-1 is reset with the predetermined number of dumps of feed for the next day.

At a preset time on the time clock assembly TC-1, contacts on time clock switch TCS-F are closed, which results in automatic resetting of numbers on counter PC-1 and the complete cycle is repeated the next day. Counter AC-1 requires manual resetting of numbers each day before the beginning of the next day or after PC-1 zeros out.

If for some reason the unit in the last row or Row-5 of the present invention is not filled to its proper level, mercury switch MRS-2 does not reverse its contacts. As a result, all the units from Row-1 through Row-5 do not leave for feed distribution even though time clock RC-1 closes contacts on switch TCS-R to give a 'start' signal. This energizes Coil B of latching relay LRY-1 which in turn energizes relay RY-4 and sounds the alarm.

A reset button PB-1 is provided to turn off the alarm.

If anyone of the units does not leave for distributing feed to the birds or does not return from the last trip, a time delay relay TDR-1 is energized and an alarm sounds.

Toggle switches TS-1 through TS-5 are provided to remove any of the units from operation without affecting the opearation of the other units. Whenever a toggle switch TS-1 through TS-5, mounted near the front end of each cage row is turned to 'off' position, a pilot light, PL-1 through PL-5, goes 'on' indicating the unit in that particular row is not in operation.

Manual shut-off switch MS-1 is provided to shut-off the complete system without disturbing the time clock TC-1. Lamp LP-1 goes 'on' whenever MS-1 is turned to 'off' position.

Whenever feed packs in cross auger near the drive end, mercury switch MRS-3 opens its contacts and shuts off the cross auger, bulk bin, and feed screen motors and hence the complete system.

With the feed system 10 as described above in combination with the control circuit of FIGS. 8 and 9, it is to be understood that all hoppers 34 are supplied with feed from conveyor tube 38 numerous times each time as directed by counter AC-1 and time clock assembly TC-1 and thereafter started on a feed dispensing cycle and returned to the starting end S for the next cycle of operation, with each unit 34 being driven on motorized carriages 32 as described above. While the control circuit of FIGS. 8 and 9 may be set to effect a given number, for example twenty cycles a day for supplying feed to the hoppers 34 and effecting feed dispensing into troughs 26, where the feed supply is exhausted after less than the twenty cycles and feed is supplied to any number of hoppers 34 but less than all hoppers 34, the last gate assembly 42' will not close the switch MRS-2 in the circuit to allow any of the hoppers 34 to be driven down toward forward end F to dispense feed. Thus all cage rows will be given the same number of feed each day, either scheduled number of feeding or less than the scheduled number of feeding by the same number.

It will be obvious to those skilled in the art that various changes may be made without departing from the scope of the invention and the invention is not to be considered limited to what is shown in the drawings and described in the specification.

What is claimed is:

1. A system for controlling the feed to be automatically distributed to livestock in numerous repeated cycles over the course of a day or like periods whereby the feed is accurately metered and dispensed comprising in combination:

means for segregating livestock in a plurality of groups:

feed receptacle means situated adjacent to said segregating mean from which livestock may avail themselves of feed;

mobile feed distributing means for accurately metering and dispensing feed into said feed receptacle means;

power actuated drive means operatively connected to said mobile feed distributing means and being effective to drive said mobile feed distributing means along a line generally parallel to said feed receptable means and also to effect dispensing of feed from said feed distributing means;

said mobile feed distributing means including adjustable metering and dispensing means for introducing controlled quantities of feed into said feed receptacle means;

means for selectively connecting and disconnecting said metering and dispensing means to and from said power actuated drive means;

control means including a clock mechanism automatically starting said drive means to periodically drive said mobile feed distributing means a selected number of times per day at regular intervals;

said segregating means including a plurality of battery cage rows in which livestock may be confined and segregated;

each of said battery cage rows including a set of cages on one side thereof along an aisle, a set of cages on the opposite side thereof along a second aisle, and each of said sets of cages consitituting a segregated group;

track means provided along the length of each of said battery cage rows on which said mobile feed distributing means are supported and travel along the length of said battery cage rows when driven by said drive means;

said mobile feed distributing means also including transversely extending rotatable axle means on which are fixedly secured wheel means and power transmitting gear means, said wheel means being supported in rolling relationship on said track means so that as said mobile feed distributing means travel along the length of said battery cage rows said axle means and said power transmitting gear means are rotatably driven 2. The system as defined in claim 1 wherein said control means includes a time clock switch which controls automatic resetting of a counter for repeating a day's cycle.

3. The system as defined in claim 2 wherein said counter is set for a predetermined number equivalent to the number of trips to be made each day by said mobile feed distributing means.

4. The system of claim 1 further comprising power shaft means rotatably supported on said mobile feed distributing means, wherein said shaft means includes a power input portion and a power output portion, said input portion including a one-way clutch unit which constitutes said means for selectively connecting said metering and dispensing means to and from said power actuated drive means, and a gearing element operatively conected to said power transmitting gear means whereby said power output portion is driven in only one direction of travel of said mobile feed distributing means along the length of said battery cage rows.

5. The system of claim 4 wherein said power output portion includes means drivingly connected to said metering and dispensing means to thereby drive the latter and meter and dispense feed in only one direction of travel of said mobile feed distributing means.

6. The system of claim 5 including motorized means for supplying drive to said power actuated drive means for driving said mobile feed distributing means and said metering and dispensing means.

7. The system of claim 6 wherein said mobile feed distributing means comprise a pair of laterally spaced-apart hopper members of which one services feed trough means situated along one side of a battery cage row and the other of which services feed trough means situated along the other side of said battery cage row, and said pair of hopper members are structurally connected to each other for travelling in unison.

8. The system of claim 7 wherein each of said hopper members comprises passage means into which feed gravitates, feed discharge port means, and said metering and dispensing means are in the form of auger members disposed within said passage means for metering feed and conveying same to said port means.

9. The system of claim 8 wherein feed dispensing tubes are connected to said port means for directing feed dispensed therefrom into said feed receptable means.

10. The system as defined in claim 9 and including a feed supply conveyor disposed at one end of said plurality of battery cage rows and extending above and transversely of the plurality of battery cage rows at said one end with clearance for said hopper members to pass thereunder, with each of said hopper members being open at the to and with said feed supply conveyor having a plurality of feed discharge openings on the under side thereof in line with each of said hopper members moving thereunder to receive feed therefrom.

11. The system as defined in claim 10 wherein said feed supply conveyor comprises a hinged closure member operatively associated with each of said discharge openings, said closure member being pivotally supported along an axis transverse to said battery cage rows and being swingable by gravity to a closed position under said discharge opening, and having an operating rod secured thereto and extending laterally therefrom, a striker member extending upwardly from a side of said hopper member to open said closure member.

12. A system for controlling the feed to be automatically distributed to livestock in numerous repeated cycles over the course of a day or like periods whereby the feed is accurately metered and dispensed comprising in combination:

means for segregating livestock into a plurality of groups:

feed receptacle means situated adjacent to said segregating means from which livestock may avail themselves of feed;

mobile feed distributing means for accurately metering and dispensing feed into said feed receptacle means;

power actuated drive means operatively connected to said mobile feed distributing means and being effective to drive said mobile feed distributing means along a line generally parallel to said feed receptacle means and also to effect dispensing of feed from said feed distributing means;

said mobile feed distributing means including adjustable metering and dispensing means for introducing controlled quantities of feed into said feed receptacle means;

means for selectively connecting and disconnecting said metering and dispensing means to and from said power actuated drive means;

said mobile feed distributing means including a pair of laterally spaced-apart hopper members of which one services feed trough means situated along one side of a battery cage row and the other of which services feed trough means situated along the other side of said battery cage row, said pair of hopper members being structurally connected to each other for travelling in unison;

a feed supply conveyor disposed at one end of said plurality of battery cage rows and extending above and transversely of the plurality of battery cage rows at said one end with clearance for said hopper members to pass thereunder, each of said hopper members being open at the top, said feed supply conveyor having a plurality of feed discharge openings on the under side thereof in line with each of said hopper members moving thereunder to receive feed therefrom;

a hinged closure member operatively associated with each of said discharge openings, said closure member being pivotally supported along an axis transverse to said battery case rows and being swingable by gravity to a closed position under said discharge opening, and having an operating rod secured thereto and extending laterally therefrom, a striker member extending upwardly from a side of said hopper member to open said closure member;

said hinged closure member of the last one of said discharge openings of said feed conveyor further including a hinged means carrying a pair of mercury switches responsive to a filled condition of the last of said hopper members, a first one of said mercury switches being in a circuit to supply feed to said hopper members by operation of said supply conveyor and the second of said switches being in a circuit to start said power actuated drive means of all of said pairs of laterally spaced-apart hopper members, said second of said switches having circuit connecting leads at opposite ends thereof to function as a single-throw double pole switch of which one lead is connected to start said power actuated drive means on being conditioned to close the circuit when said last of said hopper members is filled with feed from said feed supply conveyor, the other of said leads being in a circuit for setting off an alarm if the last of said hopper members if not filled with feed after a predetermined lapse of time.

13. The system as defined in claim 12 wherein each of said pairs of hopper members includes means for reversing the direction of drive as said members reach either end of said system.

14. The system as defined in claim 12 wherein each of said pairs of hoppers members includes a battery for powering said drive means and includes means for recharging said battery extending from one end thereof for charging contact with terminals of a charger at one end of said system.

15. The system as defined in claim 12 wherein said second of said swtiches is a two-way switch such that when it is open in the circuit for starting said power actuated drive means, it is closed in a circuit for sounding an alarm.

16. The system as defined in claim 15 wherein said hinged carrying means holds said first switch in a closed condition at the same time that it holds said second switch in closed condition as to said alarm circuit and open as to said starting circuit.

17. The system as defined in claim 16 wherein said hinged carrying means holds said first switch in an open condition at the same time that it holds said second switch in open condition as to said alarm circuit and closed as to said starting circuit.

18. The system as defined by claim 17 wherein said hinged closure member includes means for supporting said hinged carrying means to hold said first switch in an open condition when said closure member is under said last discharge opening to close same and said means for supporting said hinged carrying means being withdrawn from supporting position for said carrying means when said closure member is hinged out from under said last discharge opening to allow said carrying means to be hinged by force of gravity to hold said first switch in closed condition and also to reverse the condition of said second switch.

19. A system for controlling the feed to be automatically distributed to livestock in numerous repeated cycles over the course of a day or like periods whereby the feed is accurately metered and dispensed comprising in combination:

a. means for segregating livestock into a plurality of groups;

b. feed receptacle means situated adjacent to said segregating means from which livestock may avail themselves of feed;

c. separate mobile feed distributing units for accurately metering and dispensing feed into feed receptacle means of the various groups;

d. power actuated drive means operatively connected to said mobile feed distributing feed units along a line generally parallel to said feed receptacle means;

e. dispensing means drivingly connected to said drive means to effect dispensing of feed from units in one direction of said driving means;

f. dispensing means of one of said units being of such capacity as to dispense in a day a total amount of feed equal to all that the livestock of a first one of said groups can eat and the dispensing means of all others of said units are each of equal capacity to each other but of less capacity than the dispensing means of said one of said one of said units by as much as from about 5% to 10% and g. means for periodically filling each of said feed distributing units; and h. switching means for sensing the filled condition of said feed distributing units and facilitating actuation of said units and for sensing the unfilled condition of said feed distributing units and sounding an alarm to alert an attendant of such condition.

20. The system as defined in claim 19 wherein said dispensing means comprise auger members having a driven gear or sprocket member connected to one end thereof.

21. The system as defined in claim 20 wherein the driven gear or sprocket member of said one of said units has fewer teeth than each of the gear or sprocket members of the others of said units whereby said one of said units will dispense feed at a greater rate than the others of said units when all of said units are driven together.

22. The system as defined in claim 21 wherein said feed receptacle means are troughs which are V-shaped in cross-section and said feed dispensing means all dispense feed into said troughs in such very small quantities during each dispensing cycle that what little feed that is dispensed will gather at the bottom of said troughs and will be easily consumed by the livestock feeding therefrom.

23. The system as defined in claim 22 wherein said feed dispensing means are of such capacity as to dispense feed at the rate of about one ounce per fifteen inches length of said troughs.

* * * * *